US006539478B1

(12) United States Patent
Furuya et al.

(10) Patent No.: US 6,539,478 B1
(45) Date of Patent: Mar. 25, 2003

(54) METHOD FOR PERFORMING REMOTE OPERATIONS

(75) Inventors: Masatoshi Furuya, Sagamihara (JP); Toyohiko Yamauchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/339,962

(22) Filed: Jun. 25, 1999

(30) Foreign Application Priority Data

Jun. 29, 1998 (JP) .......................................... 10-181865

(51) Int. Cl.$^7$ ................................................ G06F 1/24
(52) U.S. Cl. ........................ 713/150; 713/163; 713/200
(58) Field of Search ................................ 713/150, 163, 713/168, 171, 200, 201

(56) References Cited

U.S. PATENT DOCUMENTS 5,703,951 A * 12/1997 Dolphin ........................ 705/51
5,706,347 A * 1/1998 Burke et al. ................. 713/153
5,706,348 A * 1/1998 Gray et al. ................... 713/160

OTHER PUBLICATIONS

"Applied Cryptography", pp. 1–4, pp. 177–178.

* cited by examiner

Primary Examiner—Thomas R. Peeso

(74) Attorney, Agent, or Firm—Antonelli, Terry, Stout & Kraus, LLP

(57) ABSTRACT

A common key 11 is shared by a controller and an operating terminal. An interface is displayed for entering control signals, and a user enters a control signal 21. A next operating rights code 22 is generated (112) and the common key 11 is used to encrypt a signal 23 that contains the control signal 21, the next operating rights code 22, and the current operating rights code 12 (114). This is then transferred to the controller (115), and the next operating rights code 22 is stored in the operating terminal (112). The controller uses the common key 11 to decrypt the transferred encrypted message 24 (117) and obtains the control signal 21, the current operating rights code 12, and the next operating rights code 22. The current operating rights code 12 is checked to see if it matches an operating rights code registered in the controller (118). If there is a match, the control signal is sent to the control device (19). The next operating rights code 22 is registered in the controller (120). The controller contains a table 90 that includes information about common keys, operating rights codes, and modes. When this system is used to perform remote operations via a network, the signals sent through the network are kept secret from third parties and operations can be performed in an exclusive manner.

9 Claims, 14 Drawing Sheets

METHOD FOR PERFORMING REMOTE OPERATIONS

BACKGROUND OF THE INVENTION

The present invention relates to a method for performing remote operations in which various types of control devices are operated using an information system network, such as the Internet, that can be used by any number of people. More specifically, the present invention relates to a method for performing remote operations in which multiple users can operate devices in an exclusive manner while allowing signals over the network to be kept secret from third parties.

A conventional example of remote operations is the use of a console at a monitoring and control room to send signals over a dedicated line for starting and stopping pumps at sewage disposal plants and drainage plants. Recently, remote operations of various types of control devices have been performed through standard information system networks using Internet and intranet technology. This makes it possible to operate various control devices from any location (data terminal) that is connected to the information system network. Also, technologies such as Java applets can be used so that software is downloaded and run when needed, thus eliminating the need for prior distribution of the software required for operating the control devices to the operators' data terminals.

With the growth of the Internet, which can allow access by any number of people, the need to protect information going through networks has grown, and various encryption technologies have been proposed and implemented. As is described in "Applied Cryptography" (pp. 1–4, pp. 197–198), encryption methods can be broadly divided into two categories. One category is public-key encryption and the other is common-key encryption.

In public-key encryption methods, the key used by the party performing encryption (the public key) is different from the key used by the party performing decryption (the private key), and only the public key is disclosed to the other party (the decrypting party). This method does not require private keys to be sent from the encrypting party to the decrypting party, and has the advantage that N+1 data terminals can exchange messages using the same combination of keys, where the N+1 terminals consist of N decrypting data terminals and one encrypting data terminal. On the other hand, public-key encryption is generally time-consuming.

In the other method, common-key encryption, the same key is used for both encryption and decryption, and this key is kept secret from third parties. The private key must be sent to the other party. Thus, N keys are required for 1-to-N communications (where there is one encrypting data terminal and N decrypting data terminals). However, the processing time required for this encryption method is generally short.

SUMMARY OF THE INVENTION

Encryption of information does not provide absolute security, however. If the same information is repeatedly encrypted with the same key, the same ciphertext would be generated, and a third party can take advantage of these identical ciphertexts. Therefore, it is necessary to generate different ciphertexts even when the same information is being sent. The technology to achieve this is known as the one-time password method. An example of the one-time password method is when the current time is used. If the current time is added to the information before encryption, the ciphertext will always be different since the current time will be continuously changing. Thus identical ciphertexts will not be generated even if the same information is being encrypted.

When remote operations are performed through a standard information system network such as the Internet, there are relatively few types of control signals that are used for remote-operations, and these signals are short. Thus, to improve security, encryption must be performed with one-time passwords. Also, since control signals can be sent from any operating terminal, the control signal decrypted by the controller is not always valid.

The object of the present invention is to provide a method for performing remote operations which, when using a network to remotely operate various types of control devices, maintains secrecy of signals going through the network from third parties and allows multiple users to perform operations in an exclusive manner.

In accordance with the present invention, this is achieved by preparing a program on the controller that performs a series of operations involving public keys and signals. When a user request is received, this program is transferred to the operating terminal. In the method for performing remote operations according to the present invention, this program generates a common key and a random next operating rights code on the operating terminal. These are placed in a signal and encrypted using the public key, and the result is sent to the controller. The common key and the next operating rights code are also stored in the operating terminal.

The controller receives the transferred encrypted message and decrypts it with the private key corresponding to the public key to obtain the common key and the next operating rights code. These are registered in the controller. Subsequent encryption and decryption operations are performed using this common key.

The program displays an interface on the screen to allow the user to enter control signals. When a control signal is received from the user, another random next operating rights code is generated. The common key is used to encrypt a signal containing the control signal, the next operating rights code, and the current operating rights code (i.e., the next operating rights code generated from the previous operation), and this is sent to the controller. The next operating rights code is stored in the operating terminal. The controller uses the common key to decrypt the transferred encrypted message to obtain the control signal, the current operating rights code, and the next operating rights code. The current operating rights code is checked to see if it matches an operating rights code registered in the controller. If there is a match, the control signal is sent to the control device. The next operating rights code is registered in the controller.

To allow multiple users to perform operations from operating terminals according to fixed rules, the controller is equipped with a table having information about common keys, operating rights codes, and modes. Even if an operating terminal has a correct common key and operating rights code, control signals will not be transferred to the control device if its mode is invalid. The validity and invalidity of modes are switched using special control signals, and modes are changed in response to an input sent from operating terminals or from changes in the contents of the table.

DETAILED DESCRIPTION OF THE PREFERRED EMBODIMENTS

Figure 3:
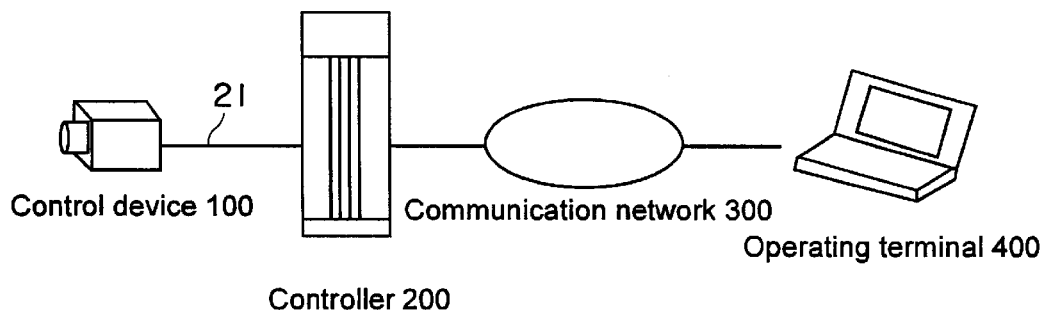
FIG. 3 is a schematic diagram showing a system that serves as the basis for the method for performing remote operations according to the present invention.

FIG. 3 is a schematic diagram showing the structure of a system used for performing remote operations according to the present invention.

A control device 100 to be operated is connected to a controller 200 and is operated through control signals 21 generated by the controller 200. The control device 200 is connected to an operating terminal 400 through a communication network 300. The control device 100 can be any device that can be controlled by control signals. In the example shown in FIG. 3, the control device 100 is an ITV (industrial television). In the description of the embodiment provided below, this ITV is remotely operated from the operating terminal 400 connected to the communication network 300, which can be a network such as the Internet.

Figure 4:
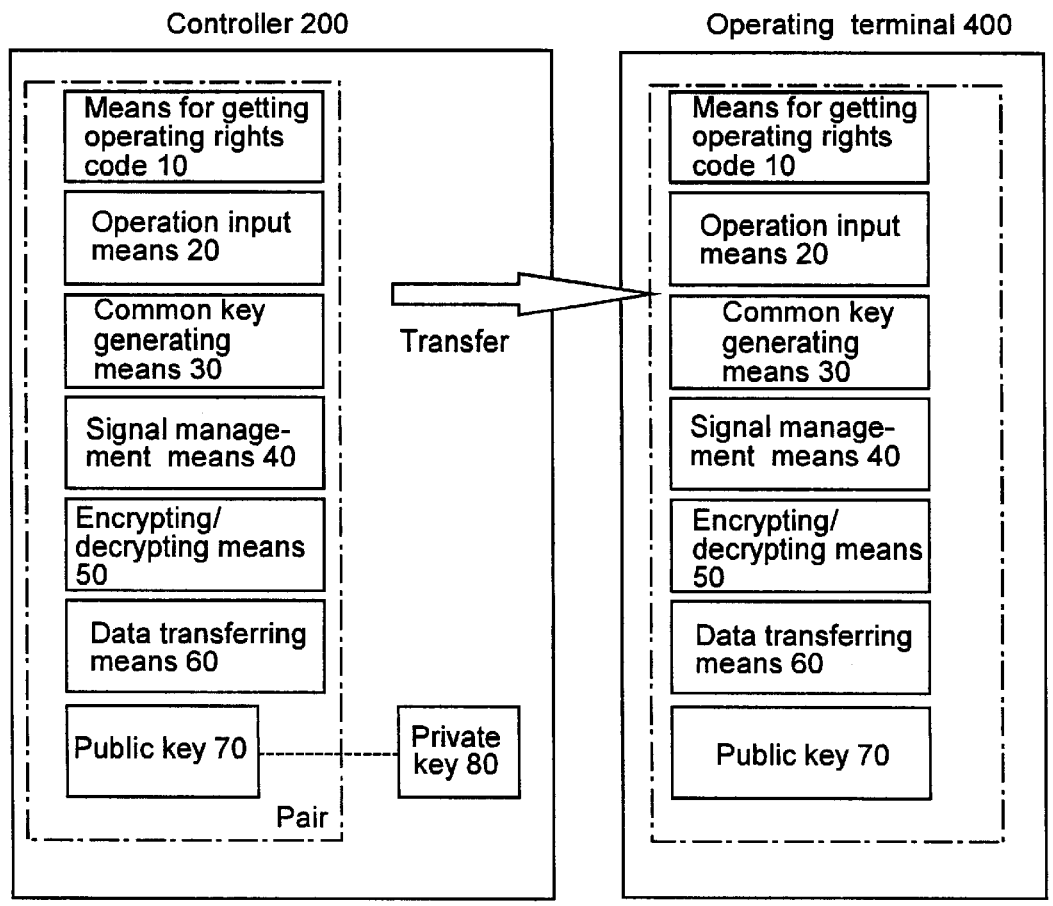
FIG. 4 is a diagram illustrating the software structure of the present invention.

FIG. 4 is a figure illustrating the software structure that can be used in the controller 200 and the operating terminal 400 to implement the method for performing remote operations according to the present invention.

As shown in FIG. 4, the controller 200 includes a software section and a data section for a common key 70. The software section implements various functions such as means for getting operating rights codes 10, operation input means 20, common key generating means 30, signal management means 40, encrypting/decrypting means 50, and data transferring means 60.

When a user is to perform remote operations through the operating terminal 400, the user loads the software in the operating terminal 400 via the communication network 300 either beforehand or when first performing operations. It would also be possible for the software to be obtained without the use of a communication network through a different medium such as floppy disks, which would be transferred either directly or through the mail.

The following description will assume that user authentication of the operating terminal 400 by the controller 200 has already been completed. The term "registering" used below refers to the entry of information into memory or files.

The following is a description of the operations performed by the operating terminal 400 and the controller 200.

Figure 1:
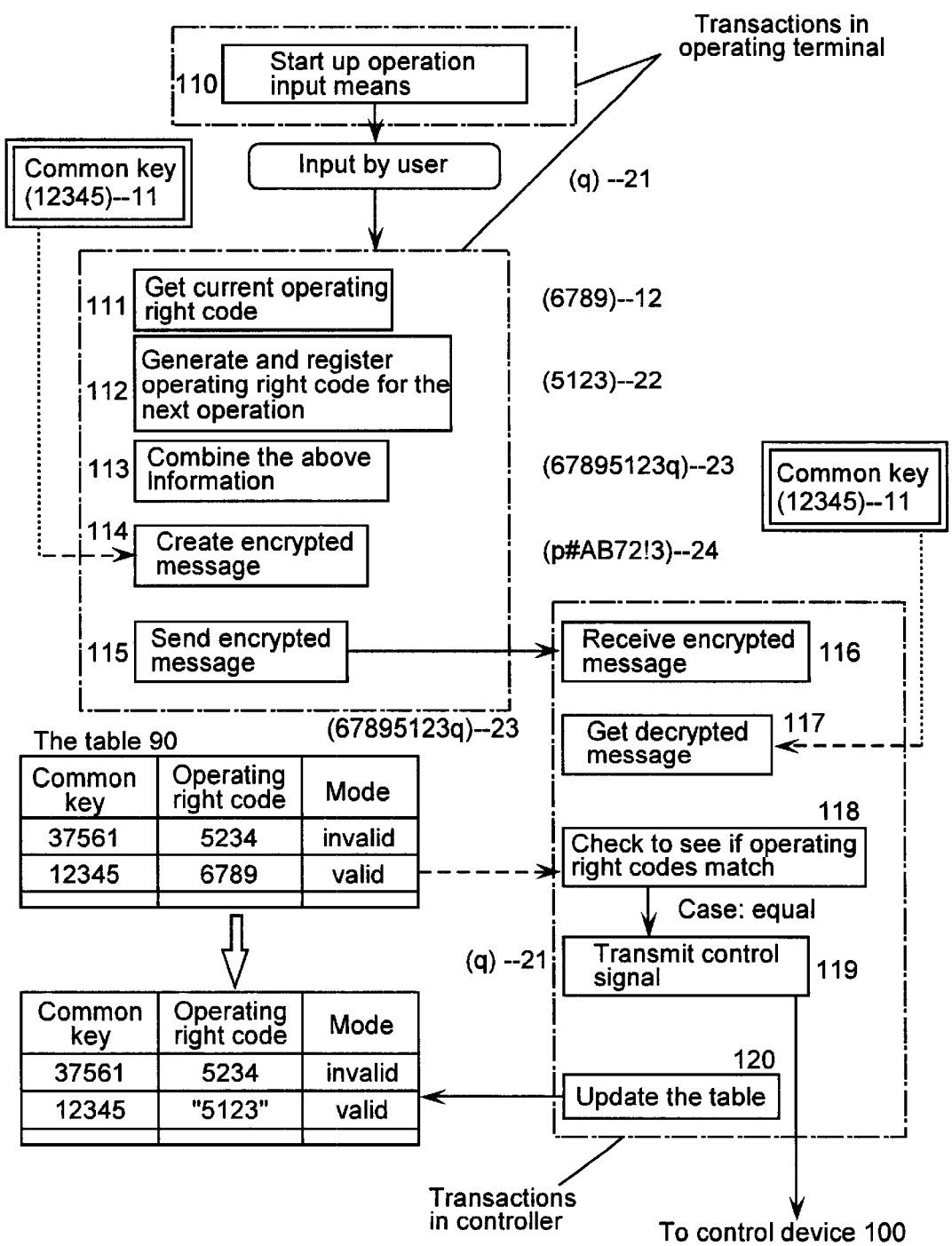
FIG. 1 is a flowchart showing the control operations performed in accordance with the present invention when an operating terminal controls a control device.
Figure 2:
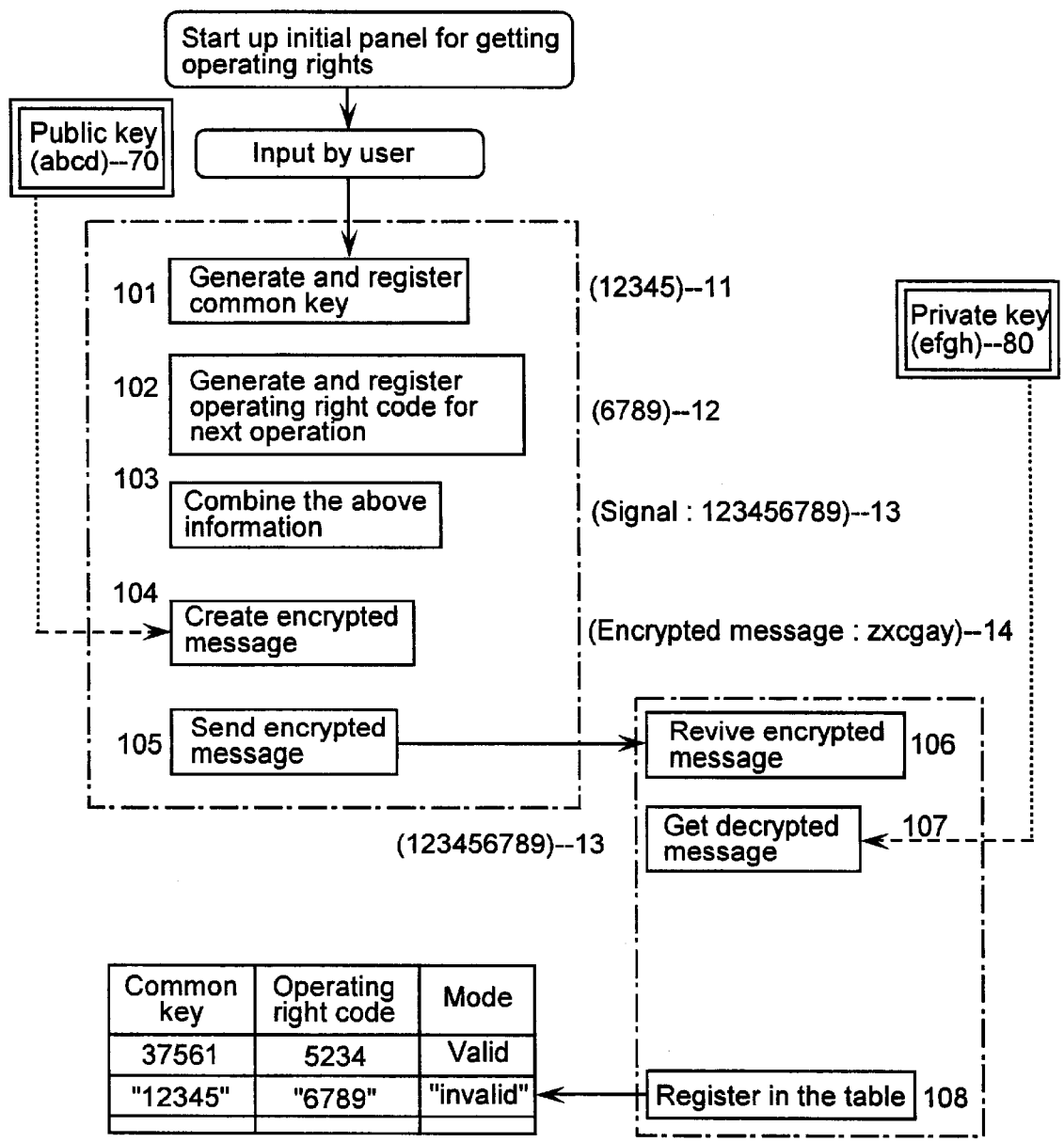
FIG. 2 is a flowchart showing the operations performed in the present invention when a common key is registered into an operating rights code management table.

FIG. 1 and FIG. 2 are flowcharts for the purpose of describing the procedures involved in the method for performing remote operations according to the present invention.

FIG. 2 is a flowchart which illustrates the procedures performed initially when the operating terminal requests an operating rights code. First, the user starts up means for getting operating rights code 10 through the operations screen on the operating terminal 400. Means for getting operating rights code 10 displays a button for requesting an operating rights code on the operation screen and requests an input from the user. When the input is received, common key generating means 30 generates a common key 11 ("12345" in the example shown in FIG. 2), and this is registered in the operating terminal 400 (step 101). Then, signal management means 40 generates the next operating rights code 12 ("6789" in the example shown in FIG. 2), and this is registered in the operating terminal 400 (step 102). Then, the common key 11 and the next operating rights code 12 are combined to generate a signal 13 ("123456789" in the example shown in FIG. 2) (step 103). Encrypting/decrypting means 50 uses the common key 70 to generate an encrypted message 14 ("zxcgay" in the example shown in FIG. 2) (step 104), and this encrypted message 14 is then transferred by data transferring means 60 to the controller 200 via the communication network 300 (step 105).

The controller 200 has the common key ("abcd" in the example shown in FIG. 2) and its corresponding private key 80 ("efgh" in the example shown in FIG. 2). When the encrypted message 14 described above is received from the operating terminal 400 (step 106), encrypting/decrypting means 50 decrypts the encrypted message 14 into the common key 11 ("12345" in the example shown in FIG. 2) and the next operating rights code 12 ("6789" in the example shown in FIG. 2) (step 107). Then, the decrypted common key 11 and the next operating rights code 12 are registered in an operating rights management table 90 (step 108). When this registration is performed, a determination is made based on rules as to whether this common key 11 should be in "valid mode" or "invalid mode".

For example, in this embodiment, the common key is set to "valid mode" and "invalid mode" in the following manner.

If no common keys are registered in the operating rights management table 90, i.e., the key is to be the first entry in the operating rights management table 90, the newly registered common key will be registered in "valid mode".

If one or more common keys in valid mode are registered in the operating rights management table 90, the newly registered common key will be registered in "invalid mode".

As described later, even if a common key is registered as being in "invalid mode", it will be changed to "valid mode" according to prescribed rules when certain events take place.

An operating terminal (user) that has a common key that is registered in "invalid mode" does not have operating rights, and only operating terminals (users) that have a common key registered in "valid mode" have operating rights.

FIG. 1 is a flowchart showing the procedures involved when actual control operations are requested by the operating terminal 400 for the control device 100 after the sequence shown in FIG. 2 has been completed. After the operation performed at step 105 in FIG. 2, operation input means 20 is automatically activated at the operating terminal 400, as shown in FIG. 1 (step 110). Operation input means 20 is an operating panel displaying screens used to generate control signals and receive inputs. Details of the control panel will be discussed later. When the user makes an entry specifying a control operation via operation input means 20 (e.g., move the control device 100 to the left), a corresponding control signal 21 ("q" in the example shown in FIG. 1) is generated.

When this happens, the current operating rights code 12 registered in the operating terminal 400 ("6789" in the example shown in FIG. 1) is obtained (step 111). Signal management means 40 generates a next operating rights code 22 ("5123" in the figure) and registers this next operating rights code 22 into the operating terminal 400 (step 112). Next, the current operating rights code 12 and the next operating rights code 22 and the control signal 21 are combined to generate a signal 23 ("67895123q" in the example shown in FIG. 1) (step 113). This is then encrypted by encrypting/decrypting means 50 using the common key 11 registered in the operating terminal 400 ("12345" in the example shown in FIG. 1), generating the encrypted message 24 ("ppc123" [?p#AB7213?] in the example shown in FIG. 1) (step 114).

Then, data transferring means 60 is used to transfer this encrypted message 24 to the controller 200 via the communication network 300 (step 115).

The controller 200 receives this encrypted message 24 ("ppc123" [?p#AB7213?] in the example shown in FIG. 1) from the operating terminal 400 (step 116). Referring to the operating rights management table 90, a common key 11 in "valid mode" ("12345" in the example shown in FIG. 1) is used so that encrypting/decrypting means 50 can decrypt the encrypted message 24 into the current operating rights code 12 ("6789" in the example shown in FIG. 1), the next operating rights code 22 ("5123" in the figure), and the control signal 21 ("q" in the example shown in FIG. 1) (step 117). Then, the current operating rights code 12 is checked to see if it matches the operating rights code corresponding to the decrypted common key that was registered in the controller 200 (step 118). If the operating rights codes match, the control signal 21 is sent to the control device 100 (step 119). In some cases, the control signal 21 may be sent after being converted into a signal that matches the format used by the control device 100. Then, the operating rights code ("6789" in the example shown in FIG. 1) corresponding to the common key ("12345" in the example shown in FIG. 1) in the operating rights management table 90 is updated to the next operating rights code 22 ("5123" in the example shown in FIG. 2) (step 120). If, at the evaluation made at step 118, it is found that the operating rights codes do not match, the operations are terminated without performing steps 119–120. These are the procedures involved in the method for performing remote operations according to the present invention.

The following is a description of the advantages provided by the operations described above.

FIG. 5 through FIG. 8(b) are drawings for the purpose of describing the advantages provided by the operations described above.

Figure 5:
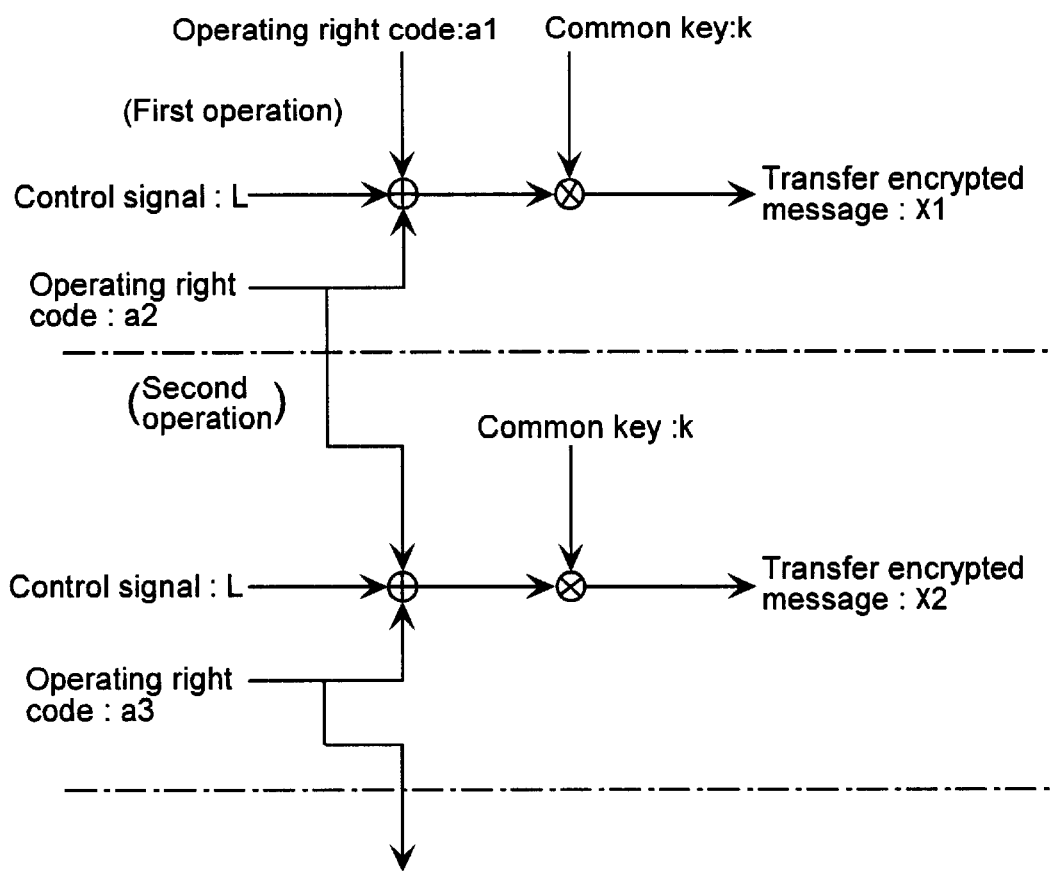
FIG. 5 is a diagram used for describing the advantages of the present invention.

FIG. 5 shows the standard operations performed under normal conditions. As shown in FIG. 5, a user (operating terminal) repeatedly sends a control signal L to the controller 200. The first time, the transferred encrypted message is X1, but the second time the transferred encrypted message will be X2. In other words, for the same control signals L, different encrypted messages will be transferred over the communication network 300. Even with different encrypted messages, the controller 200 will be able to correctly decode the requested control signals L. Furthermore, the control signals sent by the user will be kept secret from third parties.

Figure 6:
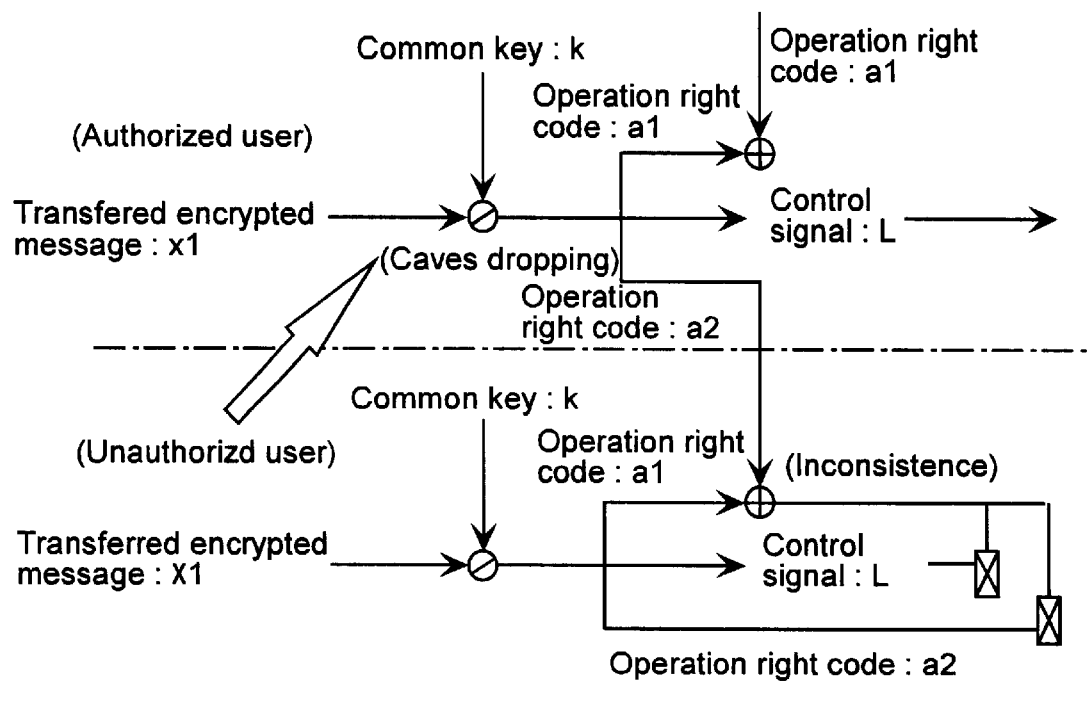
FIG. 6 is a diagram used for describing the advantages of the present invention.

FIG. 6 is a diagram for the purpose of describing a situation where an unauthorized user is eavesdropping. As shown in FIG. 6, the unauthorized user eavesdrops on the transferred encrypted message X1 from the authorized user, and then sends the same encrypted message X1 pretending to be the authorized user.

However, the controller 200 uses a common key k to decrypt the encrypted message X1 from the unauthorized user. The decrypted current operating rights code is a1 but at this point the operating rights code has already been updated to a2 by the authorized user. This results in an inconsistency and, as a result, the unauthorized user will not be able to perform the control operations.

Figure 7:
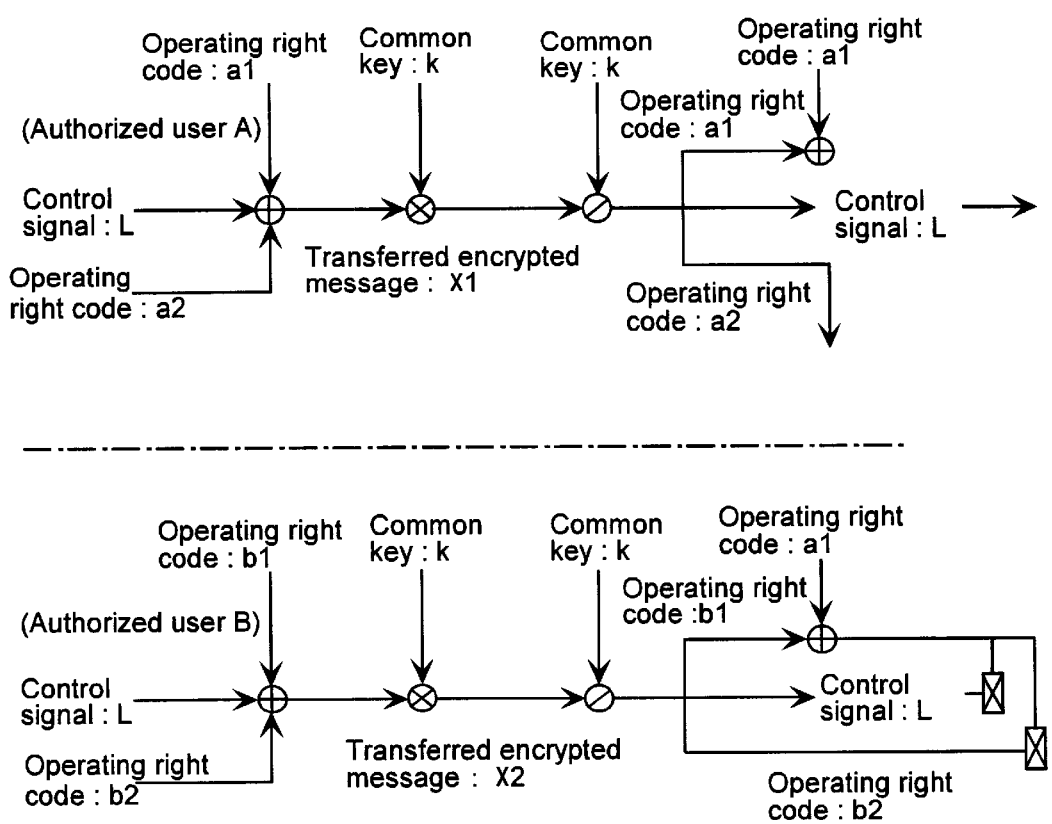
FIG. 7 is a diagram used for describing the advantages of the present invention.
Figure 9:
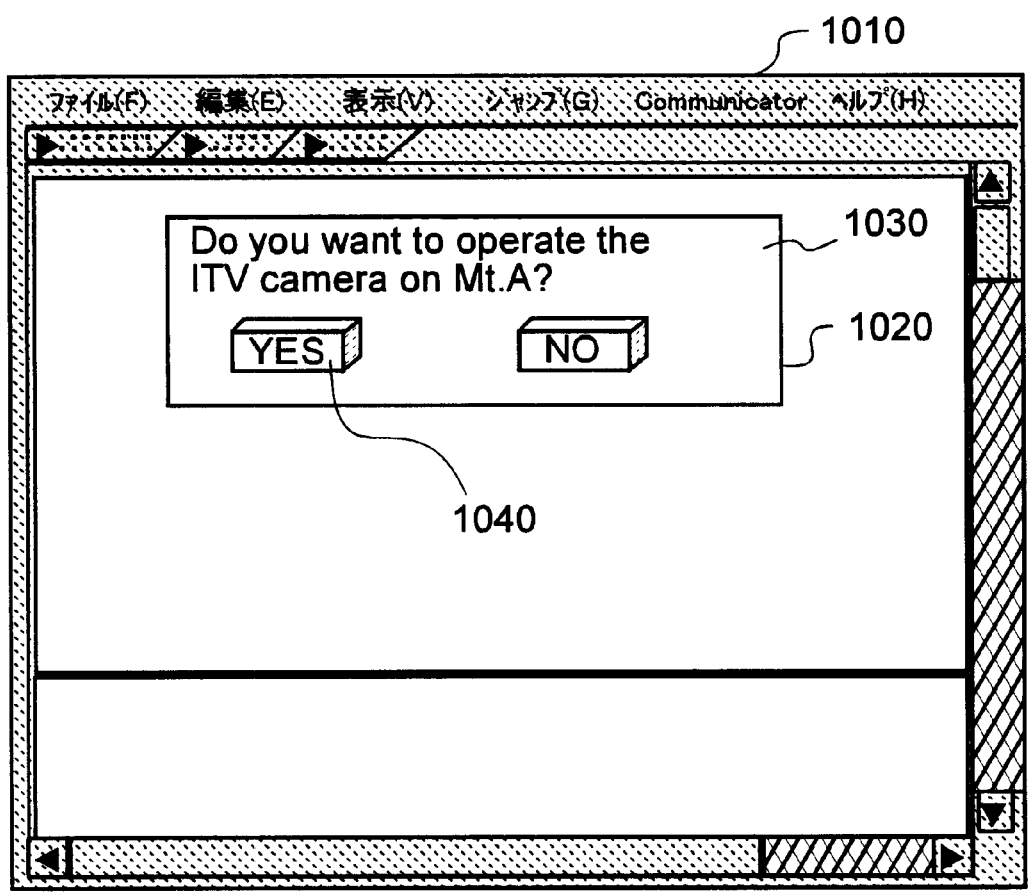
FIG. 9 is a diagram showing an example of an operation/display used in the method for performing remote operations according to the present invention.

FIG. 7 is a diagram for the purpose of describing what happens when identical common keys are registered by multiple users (operating terminals). As shown in FIG. 7, the common keys k registered by multiple users A, B happen to be identical. However, the operating terminals generate distinct, independent operating rights codes (a1, a2), (b1, b2) each time. Also, as shown in FIG. 9, the registered contents are updated each time at the operating terminals so that the transferred encrypted messages X1, X2 will be different. The control device will be able to correctly decrypt both messages using the common key k, but the only valid operating rights code will be the a1 from the user A. Thus, only operations from the user A will be valid and operations from the user B with the current operating rights code b1 will be invalid. Different operating rights codes are used each time, making the chance that even the operating codes match very small. Furthermore, even if the operating rights codes were to be identical at a certain point in time, the chance that the user B will be performing an operation at that very moment is extremely small. Thus, unauthorized use is almost impossible.

Figure 8A:
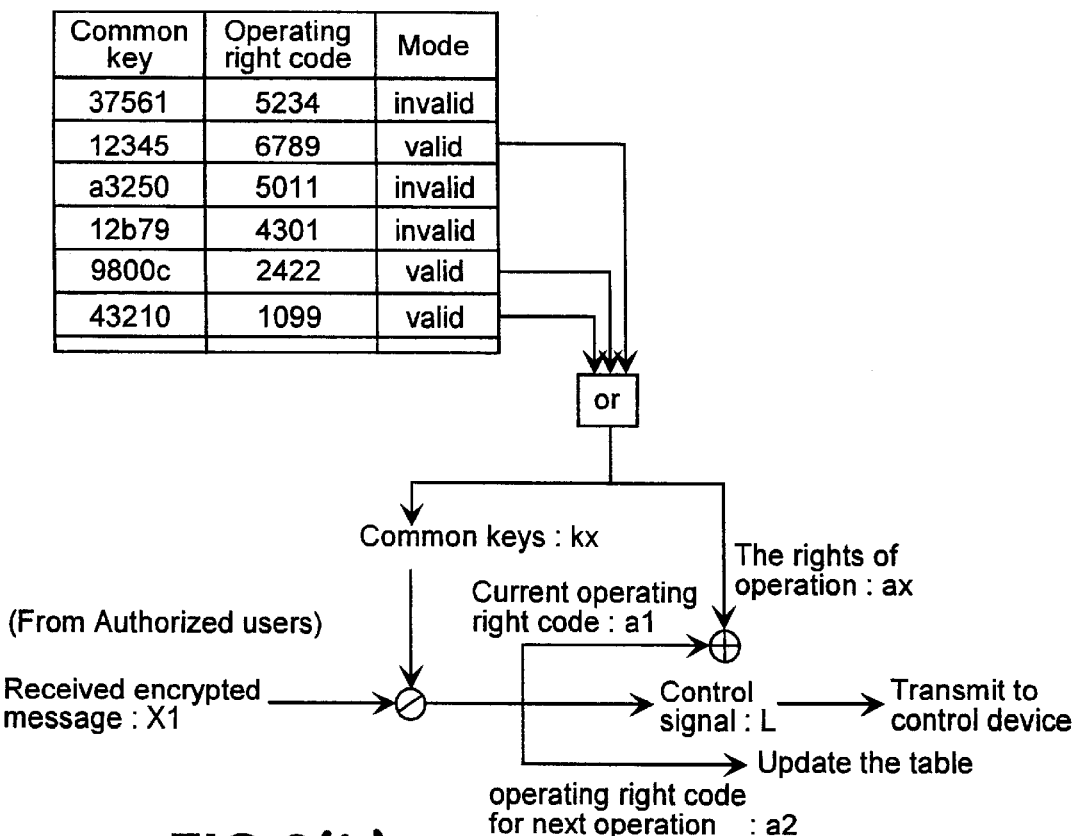
FIGS. 8(a) and 8(b) are diagrams used for describing the advantages of the present invention.
Figure 8B:
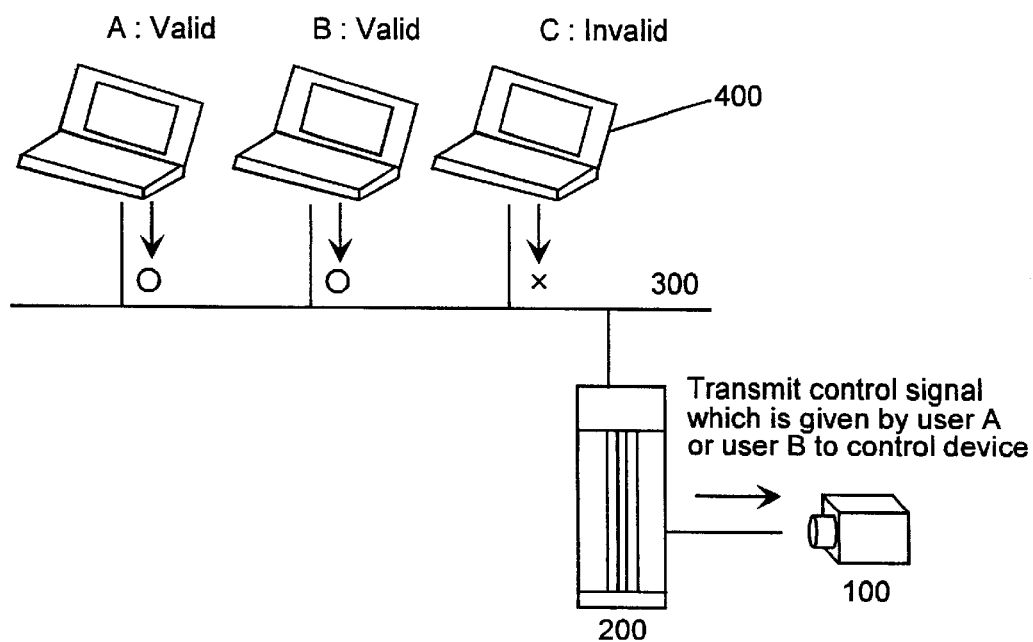

FIGS. 8(a) and 8(b) are diagrams for the purpose of describing how multiple users can be in "valid mode". As FIG. 8(a) shows, the operating rights management table 90 of the controller 200 has a column for "valid mode"/"invalid mode". If the mode of multiple users is made valid through some means (e.g., by sending a control signal that grants operating rights to multiple users), operations could be performed freely through the operating terminals used by these users. For example, as shown in FIG. 8(b), the control device 100 can receive control signals from either the user A or the user B.

In accordance with the present invention, there is no need to have public keys or common keys held (managed) by the operating terminal 400 beforehand, so there is no chance that these keys could be stolen. Furthermore, with the present invention there is no need to prepare a dedicated terminal as long as there is an environment where programs from the controller can be simply downloaded and executed via a network.

Figure 10:
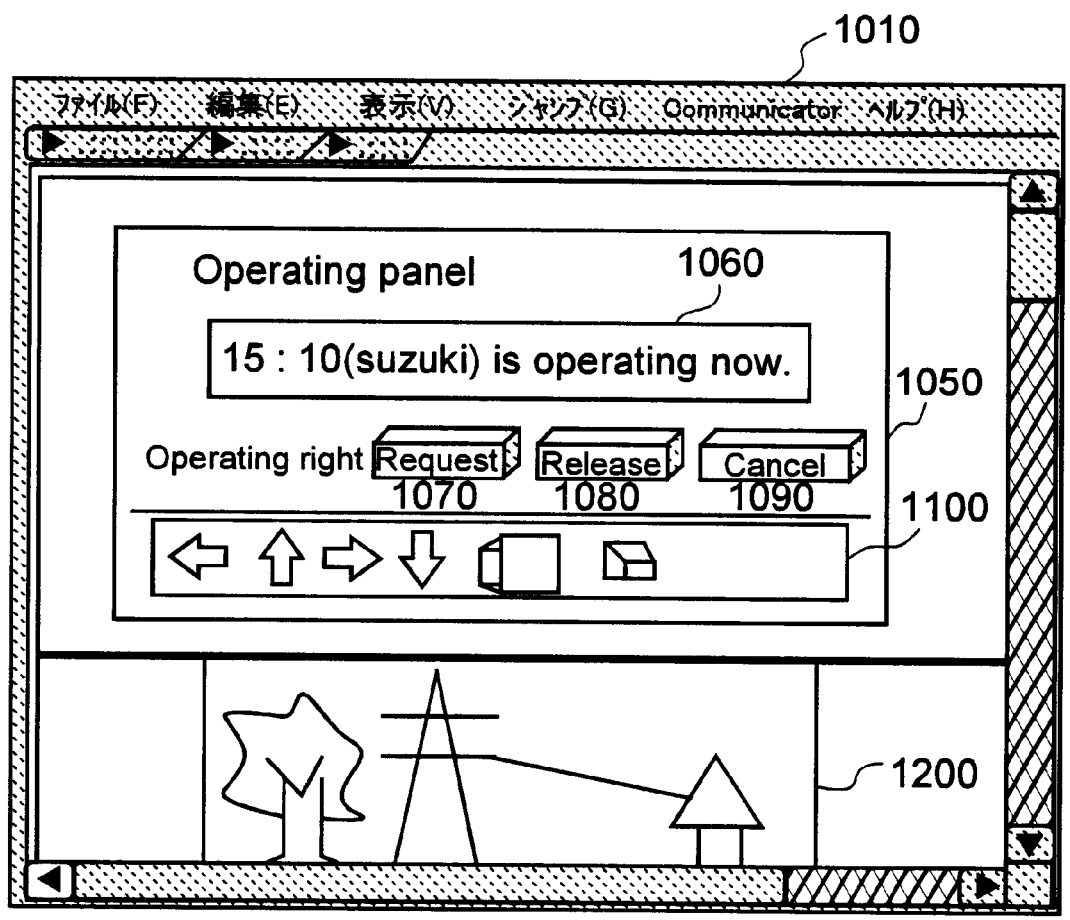
FIG. 10 is a diagram showing an example of an operation/display used in the method for performing remote operations according to the present invention.

The following is a description of a specific implementation, with references to FIG. 9 and FIG. 10.

The following is an example showing how specific operations are performed. Here, the operating terminal is a machine on which a web browser capable of running Java applets is installed. The controller is a machine that also serves as a web server.

FIG. 9 shows a sample of a displayed screen from means for getting an operating rights code of the operating terminal 400. As shown in FIG. 9, when the user accesses a prescribed page (controller) on the web server using a web browser 1010, Java class files are loaded to the Web browser for getting operating rights code 10, operation input means 20, common key generating means 30, signal management means 40, encrypting/decrypting means 50, and data transferring means 60. Means for getting operating rights Code 10 is then started. A displayed section 1020 of means for getting operating rights code 10 is displayed on the screen and shows a message 1030 asking if operating rights should be requested for the controller 200.

FIG. 9 shows an example where the displayed message 1030 says "Do you want to operate the ITV camera on Mt. A?" If the user makes a request by pressing a confirmation button 1040 for "Yes", a common key "Common" and a next operating rights code "CNT1" generated by a random number function or the like is stored in the memory of the operating terminal 400. The common key "Common" and the next operating rights code CNT1" are also registered in the operating rights management table 90 at the controller 200. Then, operation input means 20 is automatically started up and displayed on the screen. Modes will also be registered into the operating rights management table 90 of the controller 200, but it will be assumed in the description below that the common key "Common" was registered in valid mode.

FIG. 10 shows a sample of a displayed screen from operation input means 20 of the operating terminal 400. As shown in FIG. 10, a display section (operating panel) 1050 displays an operating status display window 1060, a request operating rights button 1070 ("Request"), a release operating rights button 1080 ("Release"), and a cancel operating rights button 1090 ("Cancel"). In the example shown in FIG. 10, the operating status display window 1060 displays the information "15:10 (suzuki) is operating now." The display section 1050 also includes operating tools 1100 for controlling the control device 100. If the control device 100 is a camera, the tools used for controlling the camera include vertical and horizontal panning, zoom in, and zoom out controls.

Using the operating tools 1100 of the display section 1050, a user can press, for example, the "pan left" button. A Java class file will generate the control signal "LEFT". Then, the current operating rights code "CNT1" is loaded from memory and a next operating rights code "CNT2" is generated using a random number function or the like. This code "CNT2" is stored in memory. At this stage, "CNT1" can be erased from memory but it would be preferable to keep it in order to handle various exception conditions. These are then combined for example into "THIS:CNT1:NEXT:CNT2:SIGNAL:LEFT", and an encrypted message such as "A9w24Jc71" is generated. This encrypted message is sent to the web server (controller).

At the controller 200, a program that performs a series of operations may be always running to monitor for receipt of encrypted messages. Alternatively, the program that performs the series of operations may be started up in response to an instruction from a Java class file on the operating terminal 400. This program performs operations when an encrypted message is received. For example, if an encrypted message "A9w24Jc71" is received, this program first finds a valid common key "Common" from the operating rights management table 90 and uses "Common" to decrypt the encrypted message into "THIS:CNT1:NEXT:CNT2: SIGNAL:LEFT." Then, the operating rights code "CNT1" is extracted from the encrypted message and is compared to the operating rights code "CNT1" corresponding to "Common" in the operating rights management table 90 to see if they are identical. In this case they are, so the control signal "LEFT" is extracted. This control signal "LEFT" is converted into a code "left" that can be understood by the camera, and this code is sent to the camera.

When the camera receives "left" it pans left by a predetermined angle. After a certain interval, a captured image 1200 shown in FIG. 10 changes to an image from the camera that has panned left. The certain interval is the interval at which the captured image is being refreshed. If the image is being shown in real time, it will change as soon as the control signal is sent. If the system is set up so that images are sent (captured) once a minute, however, the image will not be seen immediately even if the panning of the camera takes place immediately.

After the control signal is sent, the operating rights code corresponding to "Common" in the operating rights management table 90 is updated to "CNT2". A message such as "suzuki is operating now." is displayed in the operating status display window 1060 of the operating panel.

The following is a description of a few special operations.

The description up to now has covered operations performed with common keys that are in "valid mode". The following is a description of certain cases where common keys in "invalid mode" can be used. The purpose of this is that there are occasions when, for example, a user in "invalid mode" may send a control signal when the requests for operating rights or multiple common keys are accidentally identical.

Figure 15:
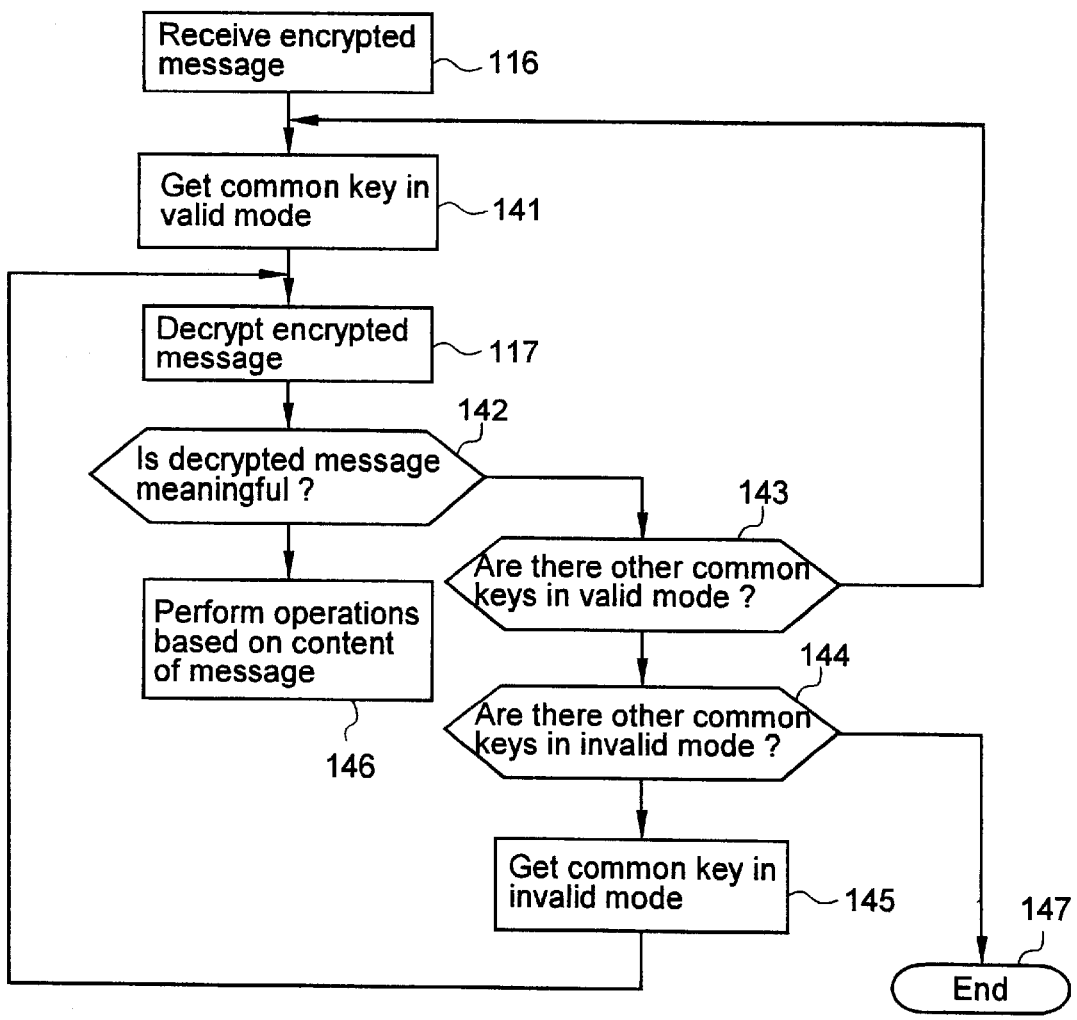
FIG. 15 is a flowchart showing the operations performed by the controller when a common key in the invalid mode is used.

FIG. 15 shows the operations performed by the controller 200 when a common key in "invalid mode" is to be used. As shown in FIG. 15, the controller 200 obtains the encrypted message 24 from the operating terminal 400 (step 116) and uses a common key 11 in "valid mode" (step 141) to decrypt the encrypted message 24 via encrypting/decrypting means 50 (step 117). However, the common key may be correct but the operating rights code may not match, or the control signal may be meaningless. Also, the common key may be incorrect so that the decrypted message is meaningless.

The decrypted message is checked to see if it is meaningful (step 142), and if it is (step 142: Y), appropriate operations are performed (step 146). If the decrypted message is meaningless (step 142: N), the operating rights management table 90 is checked to see if there are any other common keys in "valid mode" (step 143). If there are, control proceeds to step 141, and if there are not, the operating rights management table 90 is checked to see if there are any other keys in "invalid mode" (step 144). If there is a common key in "invalid mode," the common key is used (step 145), and the encrypted message is decrypted again (step 117). If there are no keys, operations are terminated (step 147).

Releasing Operating Rights

The following is a description of how operating rights are released.

Figure 11:
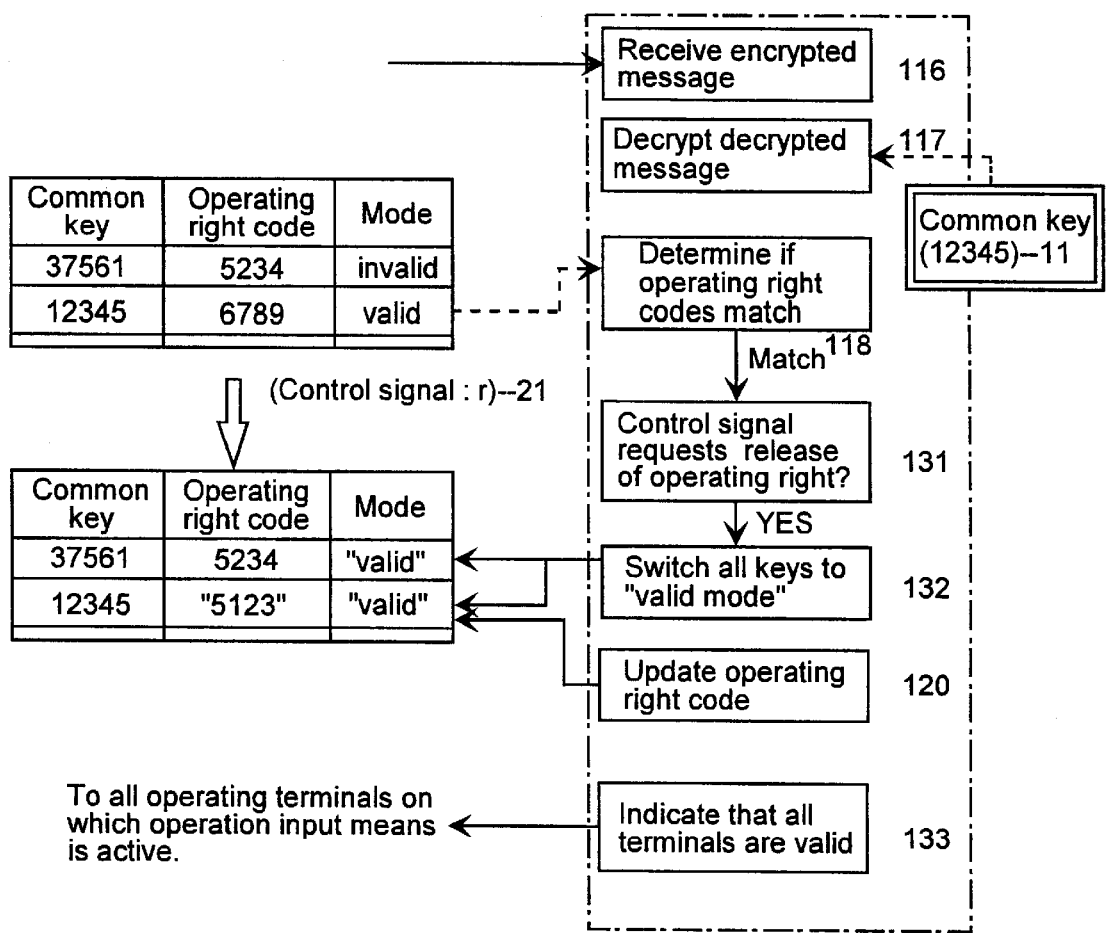
FIG. 11 is a diagram used for describing the releasing of operating rights in accordance with the present invention.

When a user (suzuki) whose operations are valid pushes the release operating rights button 1080 ("Release") on the operating panel in FIG. 10 to request a release of operating rights, the controller 200 determines if the decrypted control signal 21 specifies "release operating rights," as shown in FIG. 11 (step 131). If the signal specifies "release operating rights," then all common keys registered in the operating rights management table 90 are switched to "valid mode" (step 132), and the next operating rights code for the decrypted common key is updated (step 120). In the example shown in the figure, the next operating rights code is updated from "6789" to "5123". Then, all the operating terminals on which operation input means 20 are running are informed that everyone is in "valid mode" (e.g., a message such as "Anyone can perform operations now." is displayed on the operating status display window 1060 of the operating panel) (step 133).

The operations to be performed when the release operating rights button is pressed can also be performed when the user changes the displayed page. In other words:

The release operating rights button is pressed→Operations for sending the "release operating rights" signal are performed.

Displayed page is changed→Operations for sending the "release operating rights" signal are performed.

This prevents a user who has lost interest in looking at (controlling) the image from the camera from holding onto the operating rights. If this user were to return to the camera operating page, the user would simply be in "invalid mode" so there would be no need to register a common key again.

Getting Operating Rights

The following is a description of how operating rights are gained.

When all users are in "valid mode" and an encrypted message is sent from any of the terminals running operation input means 20 (i.e., on which common keys are registered), the controller 200 retrieves a common key from the operating rights management table 90 and decrypts the encrypted message into a current operating rights code, a next operating rights code, and a control signal. The current operating rights code is checked to see if it is identical to the operating rights code registered in the operating rights management table 90 (step 118). Many of the operations at step 118 will involve decrypting with the wrong common key so usually an unintelligible (meaningless) signal will be the results of the decryption.

Figure 12:
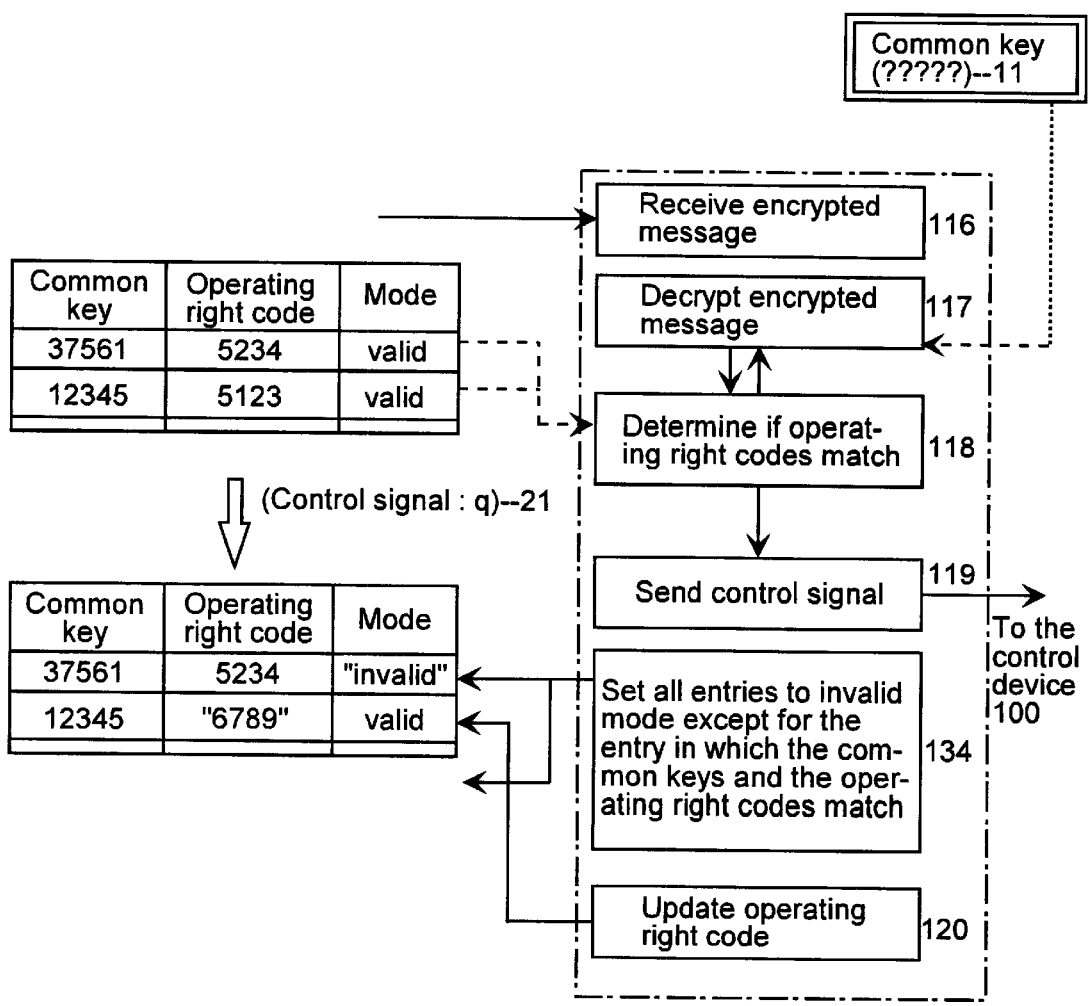
FIG. 12 is a diagram used for describing the acquisition of operating rights in accordance with the present invention.

If the operating rights codes match when decrypted with one of the common keys, the control signal is sent to the control device 100 and all common keys besides that one are placed in "invalid mode" (step 134), and the matching operating rights code is updated (in the example in FIG. 12, the next operating rights code is updated from "5123" to "6789"). In this method, the first one to issue an operation will be granted operating rights if all users have operating rights.

Releasing Operating Rights

The following is a description of how operating rights are released.

Figure 13:
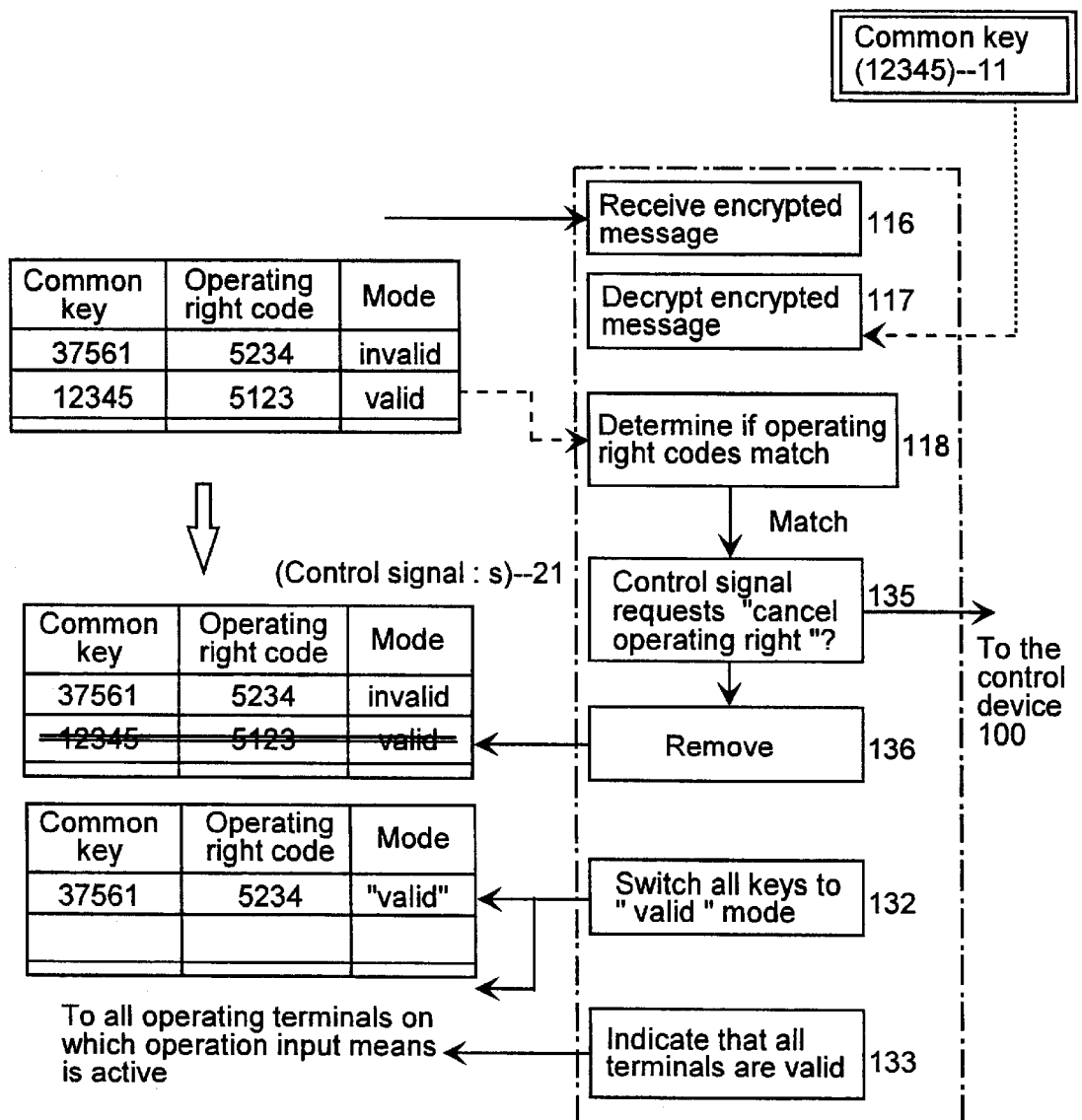
FIG. 13 is a diagram for describing the canceling of operating rights in accordance with the present invention.

Using the operating panel from FIG. 10, the user (suzuki) who has operating rights presses the cancel operating rights button 1090 ("Cancel") to release the operating rights. As shown in FIG. 13, the controller 200 determines whether the decrypted control signal 21 specifies is "release operating rights" (step 135), and if so, the entry corresponding to the decrypted common key ("12345" in the example shown in the figure) is deleted from the operating rights management table 90 (step 136). Then, all the common keys registered in the operating rights management table 90 are switched to "valid mode" (step 132), and all the operating terminals running operation input means 20 are notified that everyone is in "valid mode" (a message such as "Anyone can perform operations now." is displayed on the operating status display window 1060 of the operating panel) (step 133).

The operations to be performed when the release operating rights button is pressed can also be performed when the user changes the displayed page. In other words:

The release operating rights button is pressed→Operations for sending the "release operating rights" signal are performed.

Displayed page is changed→Operations for sending the "release operating rights" signal are performed.

This prevents a user who has lost interest in looking at (controlling) the image from the camera from holding onto the operating rights. If this user were to return to the camera operating page, the user would simply be in "invalid mode" so there would be no need to register a common key again.

Requesting Operating Rights

The following is a description of how operating rights are requested.

Figure 14:
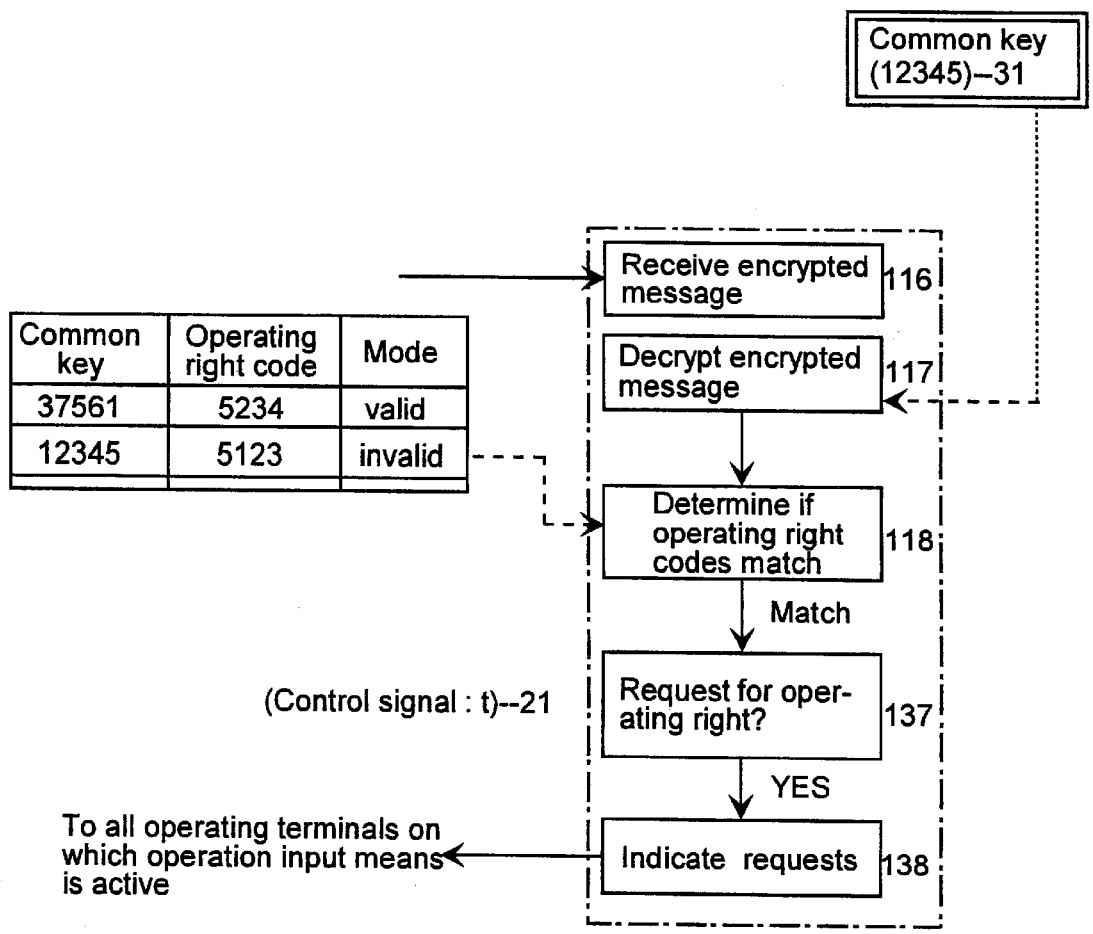
FIG. 14 is a diagram used for describing the requesting of operating rights in accordance with the present invention.

Using the operating panel shown in FIG. 10, the user (tanaka) whose operations are not valid presses the request operating rights button 1070 ("Request") to request operating rights. As shown in FIG. 14, the controller 200 determines whether the control signal 21 decrypted using one of the common keys 31 in the operating rights management table 90 is a request to release operating rights (step 137). If so, all operating terminals running operation input means 20 are notified that there is a request for operating rights (a message such as "tanaka is currently requesting operating rights." is displayed in the operating status display window 1060 of the control panel) (step 138).

If, at this point, the user (suzuki) holding valid operating rights releases operating rights, the user (tanaka) making the request is given priority for getting operating rights.

In the embodiment described above, a public key is used when initially determining a common key. However, this public key is used only at the start of operations, so it is possible for someone to change the public key-private key pair even while performing operations. Unauthorized access can be made more difficult by periodically updating public key-private key pairs on the controller side.

In the embodiment described above, each operating terminal generates a common key in order to transfer control signals. However, it would also be possible to use public keys instead. However, with the public-key method, encryption and decryption become more time consuming. Also, since all users are using the same encryption key, there is a greater chance that identical operating rights codes will come up accidentally. It would be possible to have each user use a different key by making each operating terminal initially generate its own public key-private key pair, with the private key being sent to the controller. However, this does not eliminate the issue of processing time.

It would also be possible to use a different common key each time a control signal is sent. However, generating a common key is complicated. If, because of this, different operating rights codes are not generated each time, operation conflicts will result when identical common keys are generated accidentally.

The following significant advantages are provided by the present invention.

(1) Different encrypted messages are sent over the communication network even if the control signals are the same. The requested control signals will be decrypted correctly by the controller even if the encrypted messages are different. The contents of the control signals sent by users will remain secret over the communication network.

(2) If an unauthorized user eavesdrops on an encrypted message sent by an authorized user and sends the same encrypted message pretending to be the authorized user, the unauthorized user will not be able to perform operations since the operating rights code will already be different.

(3) There is no need to have the common key stored beforehand. If different users happen to have identical common keys, they will not be able to perform operations without having the proper operating rights code. The chance of having identical operating rights codes is small.

(4) Operating rights can be granted to multiple users at the same time.

(5) The user does not need to be concerned about key management when not performing operations.

(6) There is no need to prepare keys for each user beforehand.

(8) If the user is no longer interested in performing operations or does not want to perform further operations, the operating rights will not stay with the user indefinitely and can be passed on to a different user who wants to perform operations.

(9) The public key used in the session to register common keys can be changed regardless of whether the user is performing operations or not.

What is claimed is:

1. In a system including a controller, a control device operating on the basis of control signals from said controller, and an operating terminal connected to said controller via a communication network, a method of performing remote operations for controlling said control device through use of said operating terminal comprising the steps of:
   providing each of said controller and said operating terminal with a common key and means for encrypting and decrypting using said common key;
   generating and storing a next operating rights code signal on said operating terminal;
   encrypting a combination of a control signal obtained from a user, said next operating rights code, and a current operating rights code stored from a previous operation, said encryption being performed using said common key;
   transferring a resulting encrypted message to said controller;
   decrypting said encrypted message on said controller using said common key, and decoding said message into said control signal, said next operating rights code, and said current operating rights code;
   determining whether said current operating rights code transferred for this operation is identical to an operating rights code transferred and stored from said previous operation;
   storing said next operating rights code that was transferred to said controller if said operating rights codes are identical; and
   operating said control device according to said transferred control signal.

2. A method of performing remote operations according to claim 1 further comprising the steps of:
   providing said operating terminal with a public key and means for encrypting using said public key;
   providing said controller with a private key corresponding to said public key and means for decrypting using said private key;
   generating and storing a common key and a next operating rights code on said operating terminal;
   transferring to said controller an encrypted message generated using said public key from a combination of said common key and said next operating rights code signal;
   decrypting said encrypted message on said controller using said private key and decoding said common key and said next operating rights code; and
   storing said common key and said next operating rights code signal in said controller so that said common key and an initial next operating rights code can be shared by both said controller and said operating terminal.

3. A method of performing remote operations according to claim 1 further comprising a step of providing said control device with a table containing fields for said common keys, said next operating right codes, and modes indicating whether or not operations are valid.

4. A method of performing remote operations according to claim 3 further comprising a step of switching all common keys stored on said controller to a state where operations are valid if said control signal obtained from said user is a signal for releasing operating rights.

5. A method of performing remote operations according to claim 3 further comprising a step of operating said control device via said controller if all common keys stored in said controller are in a state where operations are valid and a control signal is received from a user having a common key, and updating operating rights so that operating rights are granted only to said common key that was able to decrypt said encrypted message, while all other common keys are switched to a state where operations are invalid.

6. A method of performing remote operations according to claim 3 further comprising a step of deleting a common key if said control signal is a signal indicating release of operating rights, said common key being obtained from said release signal, and switching all stored common keys to a state where operations are valid.

7. A method of performing remote operations according to claim 2 further comprising a step of having said operating terminal receive and update, via said communication network, a public key and a private key generated periodically by said controller.

8. In a system including: a controller, a control device operating on the basis of control signals from said controller, and an operating terminal connected to said controller via a communication network, a method of performing remote operations for controlling said control device through use of said operating terminal comprising the steps of:
   providing said operating terminal with a public key and means for encrypting using said public key;
   providing said controller with a private key corresponding to said public key and means for decrypting using said private key;
   generating and storing a next operating rights code signal on said operating terminal;
   encrypting a combination of a control signal obtained from a user, said next operating rights code, and a current operating rights code stored from a previous operation, said encryption being performed using said public key;

transferring a resulting encrypted message to said controller;

decrypting said encrypted message on said controller using said private key, and decoding said message into said control signal, said next operating rights code, and said current operating rights code;

determining whether said current operating rights code transferred for this operation is identical to an operating rights code transferred and stored from said previous operation;

storing said next operating rights code that was transferred to said controller if said operating rights codes are identical; and operating said control device according to said transferred control signal.

9. In a system including: a controller, a control device operating on the basis of control signals from said controller, and an operating terminal connected to said controller via a communication network, a method of performing remote operations for controlling said control device through use of said operating terminal, said controller and said operating terminal having a common key and means for encrypting and decrypting using said common key, comprising the steps of:

generating and storing a next operating rights code signal on said operating terminal;

encrypting a combination of a control signal obtained from a user and said next operating rights code, said encryption being performed using said common key, and generating an encrypted message;

transferring said encrypted message to said controller;

decrypting said encrypted message on said controller using said common key, and decoding said message into said control signal and said next operating rights code;

storing said next operating rights code that was transferred to said controller; and operating said control device according to said transferred control signal.

* * * * *